(12) United States Patent
Devore et al.

(10) Patent No.: US 10,947,853 B2
(45) Date of Patent: *Mar. 16, 2021

(54) GAS TURBINE COMPONENT WITH PLATFORM COOLING

(71) Applicant: RAYTHEON TECHNOLOGIES CORPORATION, Farmington, CT (US)

(72) Inventors: Matthew A. Devore, Rocky Hill, CT (US); Matthew S. Gleiner, Norwalk, CT (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 12 days.

This patent is subject to a terminal disclaimer.

(21) Appl. No.: 16/581,895

(22) Filed: Sep. 25, 2019

(65) Prior Publication Data

US 2020/0080424 A1 Mar. 12, 2020

Related U.S. Application Data

(63) Continuation of application No. 14/854,213, filed on Sep. 15, 2015, now Pat. No. 10,465,523.

(Continued)

(51) Int. Cl.
*F01D 5/18* (2006.01)
*F01D 25/12* (2006.01)
*F01D 9/02* (2006.01)

(52) U.S. Cl.
CPC .............. *F01D 5/18* (2013.01); *F01D 9/023* (2013.01); *F01D 25/12* (2013.01);

(Continued)

(58) Field of Classification Search
CPC ... F01D 5/08; F01D 5/081; F01D 5/18; F01D 5/186; F01D 5/187; F01D 9/023; F01D 25/12; F05D 2240/80; F05D 2240/81
See application file for complete search history.

(56) References Cited

U.S. PATENT DOCUMENTS 3,066,910 A   12/1962  Bluck
4,447,190 A    5/1984  Campbell
(Continued)

FOREIGN PATENT DOCUMENTS

EP    2597262 B1    8/2014
EP    2977555 A1    1/2016

OTHER PUBLICATIONS

Extended European Search Report for European Application No. 15190303.6, dated Feb. 22, 2016.

(Continued)

*Primary Examiner* — Courtney D Heinle
*Assistant Examiner* — Sang K Kim
(74) *Attorney, Agent, or Firm* — Carlson, Gaskey & Olds, P.C.

(57) ABSTRACT

A gas turbine engine component includes an airfoil that has a leading edge and extends from a first side of a platform that has a leading edge overhang. A root portion extends from a second side of the platform opposite the first side. A cooling passage extends through the platform and beneath a trailing edge of the airfoil. The cooling passage includes an inlet located on a second opposite side of the platform. The inlet is located axially upstream of the leading edge of the airfoil and the inlet is located axially upstream of the root portion in the leading edge overhang.

20 Claims, 3 Drawing Sheets

Related U.S. Application Data

(60) Provisional application No. 62/065,204, filed on Oct. 17, 2014.

(52) U.S. Cl.
CPC ...... *F05D 2240/81* (2013.01); *F05D 2260/20* (2013.01); *F05D 2260/201* (2013.01); *Y02T 50/60* (2013.01)

(56) References Cited

U.S. PATENT DOCUMENTS

| | | |
|---|---|---|
| 5,222,742 A | 6/1993 | Roberts |
| 5,382,135 A | 1/1995 | Green |
| 5,639,216 A | 6/1997 | McLaurin et al. |
| 6,071,075 A | 6/2000 | Tomita |
| 6,120,249 A | 9/2000 | Hultgren et al. |
| 6,190,130 B1 | 2/2001 | Fukue |
| 6,210,111 B1 | 4/2001 | Liang |
| 6,402,471 B1 | 6/2002 | Demers |
| 6,638,012 B2 | 10/2003 | Bekrenev |
| 6,945,749 B2 | 9/2005 | De Cardenas |
| 6,945,750 B2 | 9/2005 | Benedetti et al. |
| 7,255,536 B2 | 8/2007 | Cunha et al. |
| 8,356,978 B2 | 1/2013 | Beattie et al. |
| 8,381,533 B2 | 2/2013 | Smoke |
| 8,636,470 B2 | 1/2014 | Halfmann |
| 9,091,180 B2 | 7/2015 | Wiebe |
| 2009/0232660 A1* | 9/2009 | Liang ................. F01D 5/187 416/97 R |
| 2011/0123310 A1* | 5/2011 | Beattie ................ F01D 5/18 415/115 |
| 2016/0305254 A1* | 10/2016 | Snyder ............... F01D 11/006 |

OTHER PUBLICATIONS

Dissertation by Yao-Hsien Liu—Heat Transfer in Leading and Trailing Edge Cooling Channels of the Gas Turbine Blade Under High Rotation Numbers. Dec. 2008. Texas A&M University. Retrieved from the Internet: http://oaktrust.library.tamu.edu/bitstream/nhandle/1969.1/ETD-TAMU-3196/LIU-Dissertation.pdf?sequence=1>.

* cited by examiner

GAS TURBINE COMPONENT WITH PLATFORM COOLING

CROSS-REFERENCE TO RELATED APPLICATIONS

This application is a continuation of U.S. application Ser. No. 14/854,213 filed Sep. 15, 2015, which claims priority to U.S. Provisional Application No. 62/065,204, which was filed on Oct. 17, 2014 and is incorporated herein by reference.

STATEMENT REGARDING FEDERALLY SPONSORED RESEARCH OR DEVELOPMENT

This invention was made with government support under Contract No. F33615-03-D-2354-0009 awarded by the United States Air Force. The Government may therefore have certain rights in this invention.

BACKGROUND

This application relates to a cooling passage for a platform in a gas turbine component. Gas turbine engines include a compressor which compresses air and delivers it downstream into a combustion section. The air is mixed with fuel in the combustion section and ignited. Products of this combustion pass downstream over turbine rotors, which are driven to rotate. In addition, static vanes are positioned adjacent to the turbine rotors to control the flow of the products of combustion.

The turbine rotors carry blades. The blades and the static vanes have airfoils extending from platforms. The blades and vanes are subject to extreme heat, and thus cooling schemes are utilized for each.

It is known to provide a cooling passage in the platform of the vanes and blades to cool the platform on the pressure side. Such passages have an outlet on the pressure side of the platform.

SUMMARY

In one exemplary embodiment, a gas turbine engine component includes an airfoil that extends from a first side of a platform and a cooling passage that extends through the platform and includes an inlet located on a second opposite side of the platform. The inlet is located axially upstream of the airfoil.

In a further embodiment of the above, a root portion extends from the second side of the platform. The inlet is located axially upstream of the root portion.

In a further embodiment of any of the above, the platform includes a leading edge overhang and the inlet is located in the leading edge overhang.

In a further embodiment of any of the above, the cooling passage includes an outlet located on the first side of the platform.

In a further embodiment of any of the above, the cooling passage extends beneath a portion of the airfoil.

In a further embodiment of any of the above, a first portion of the cooling passage is located on a pressure side of the platform and a second portion of the cooling passage is located on a suction side of the platform.

In a further embodiment of any of the above, the cooling passage includes a plurality of cooling structures that extend from a radially inner side of the cooling passage to a radially outer side of the cooling passage.

In a further embodiment of any of the above, the component is a turbine blade for a gas turbine engine.

In another exemplary embodiment, a gas turbine engine includes a first array of vanes. A first rotor assembly includes a first array of rotor blades that are located downstream of the first array of vanes. At least one of the first array of rotor blades includes a cooling passage that extends through a platform with an inlet that is located in a radially inner side of a leading edge overhang of the platform.

In a further embodiment of the above, the leading edge overhang is located axially forward of a root portion of at least one of the first array of rotor blades.

In a further embodiment of any of the above, a first tangential onboard injector is configured to direct cooling air at the first rotor assembly.

In a further embodiment of any of the above, a second tangential onboard injector is configured to direct cooling air at the first array of rotor blades.

In a further embodiment of any of the above, the second tangential onboard injector is configured to direct cooling air into a forward stage cavity.

In a further embodiment of any of the above, the second tangential onboard injector is located radially outward from the first tangential onboard injector.

In a further embodiment of any of the above, a portion of the cooling passage is located on a pressure side of the platform.

In a further embodiment of any of the above, an outlet is located on a radially outer side of the platform.

In another exemplary embodiment, a method of cooling a gas turbine engine component includes directing cooling air into a forward stage cavity, directing the cooling air through an inlet in an overhang of a platform of at least one rotor blade and directing the cooling air through a cooling passage extending through the platform of the at least one rotor blade.

In a further embodiment of the above, the method includes directing the cooling air into the forward stage cavity with a tangential onboard injector.

In a further embodiment of any of the above, a root portion extends from a second side of the platform and the inlet is located axially upstream of the root portion.

In a further embodiment of any of the above, the overhang is a leading edge overhang that is located axially forward of a root portion of the at least one rotor blade.

DETAILED DESCRIPTION

Figure 1:
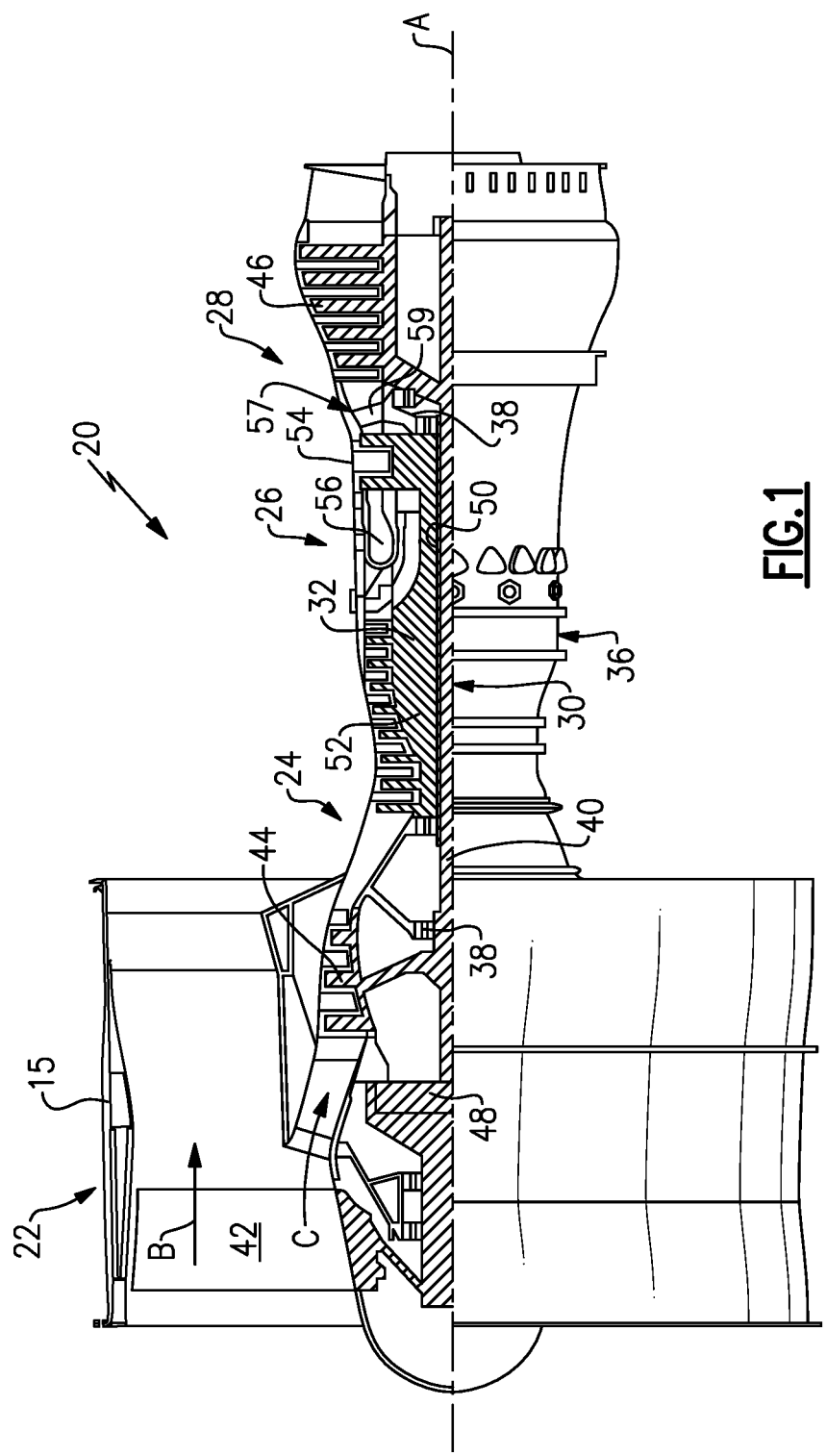
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
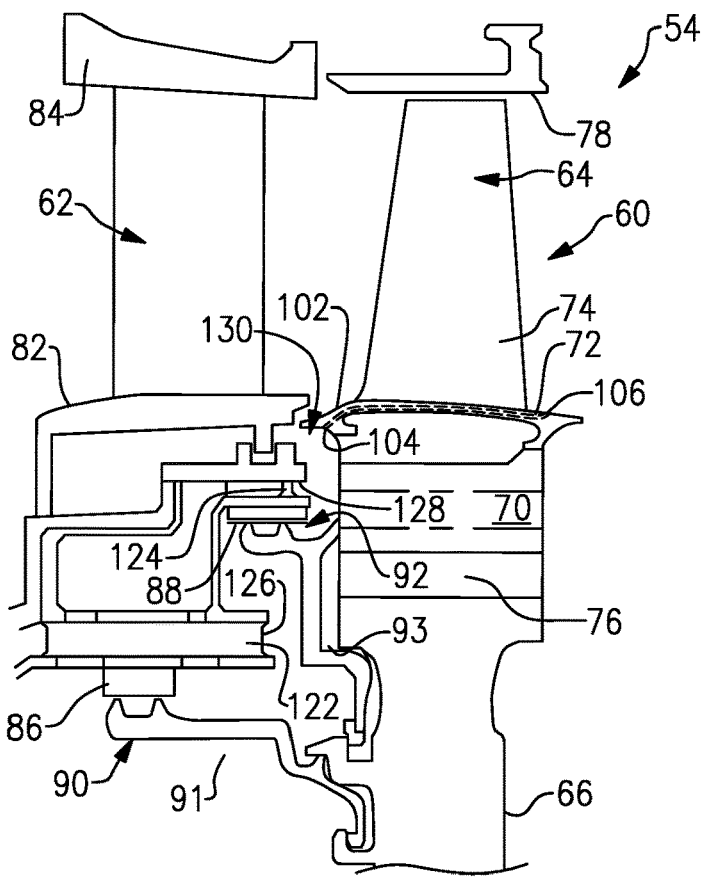
FIG. 2 is a schematic view of a turbine section.

FIG. 2 illustrates an enlarged schematic view of the high pressure turbine 54, however, other sections of the gas turbine engine 20 could benefit from this disclosure. The high pressure turbine 54 generally includes a one-stage turbine section. However, this disclose also applies to a two-stage turbine section. A rotor assembly 60 is attached to and rotates with the outer shaft 50 (FIG. 1).

The rotor assembly 60 includes an array of rotor blades 64 circumferentially spaced around a disk 66. Each of the array of rotor blades 64 includes a respective root portion 70, a platform 72, and an airfoil 74. Each of the root portions 70 is received within a respective rim 76 of the disk 66. The airfoil 74 extends radially outward toward a blade outer air seal (BOAS) assembly 78.

The array of rotor blades 64 is disposed in a core flow path. The core flow path was pressurized in the compressor section 24 then heated in the combustor section 26. The platform 72 separates the hot gas path airflow side inclusive of the array of rotor blades 64 and a non-gas path side inclusive of the root portion 70.

The array of vanes 62 extend between a respective inner vane platform 82 and an outer vane platform 84 to direct the core flow path past the array of vanes 62. The array of vanes 62 may be supported by the engine case structure 36.

A first abradable annular seal 86 and a second abradable annular seal 88, such as honeycomb seals, to seal the hot gas path airflow in the radial direction. The first abradable annular seal 86 is located adjacent a first plurality of knife edge seals 90 extending from a first disk plate 91 and the second abradable annular seal 88 is located adjacent a second plurality of knife edge seals 92 extending from a second disk plate 93.

Figure 3:
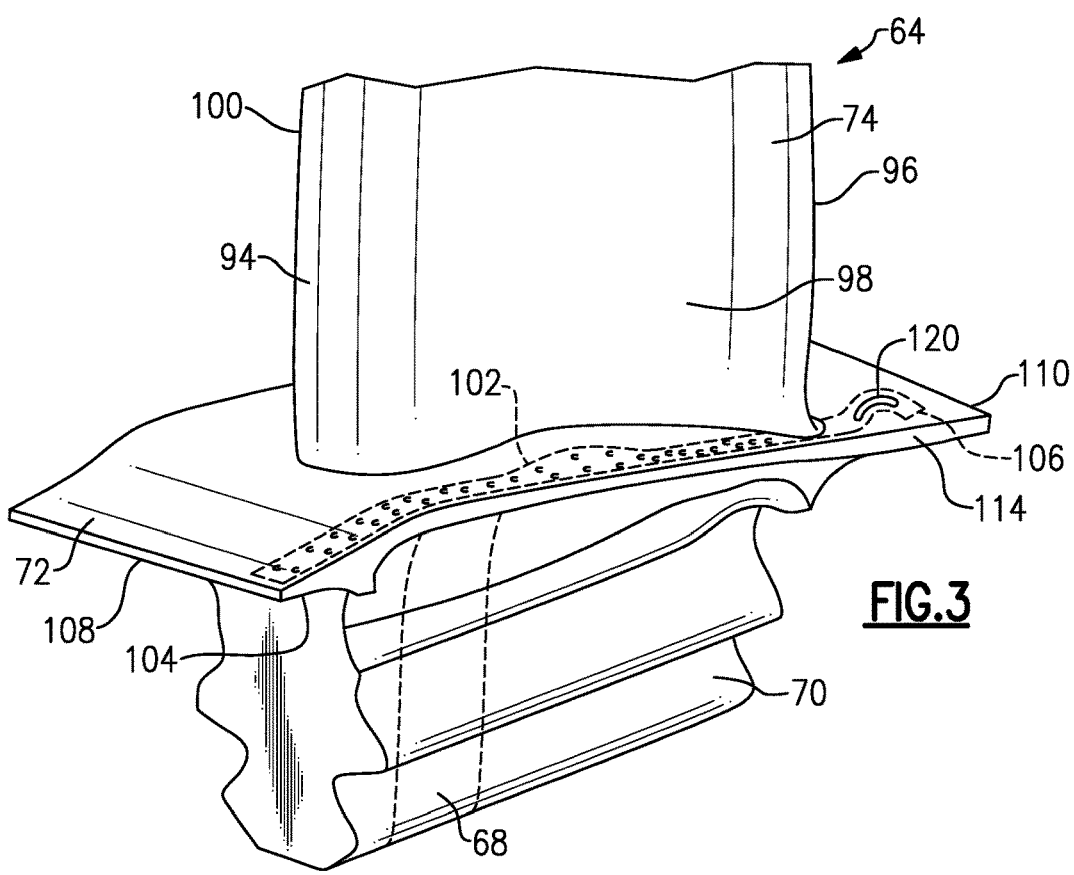
FIG. 3 illustrates a perspective view of an example rotor blade.
Figure 4:
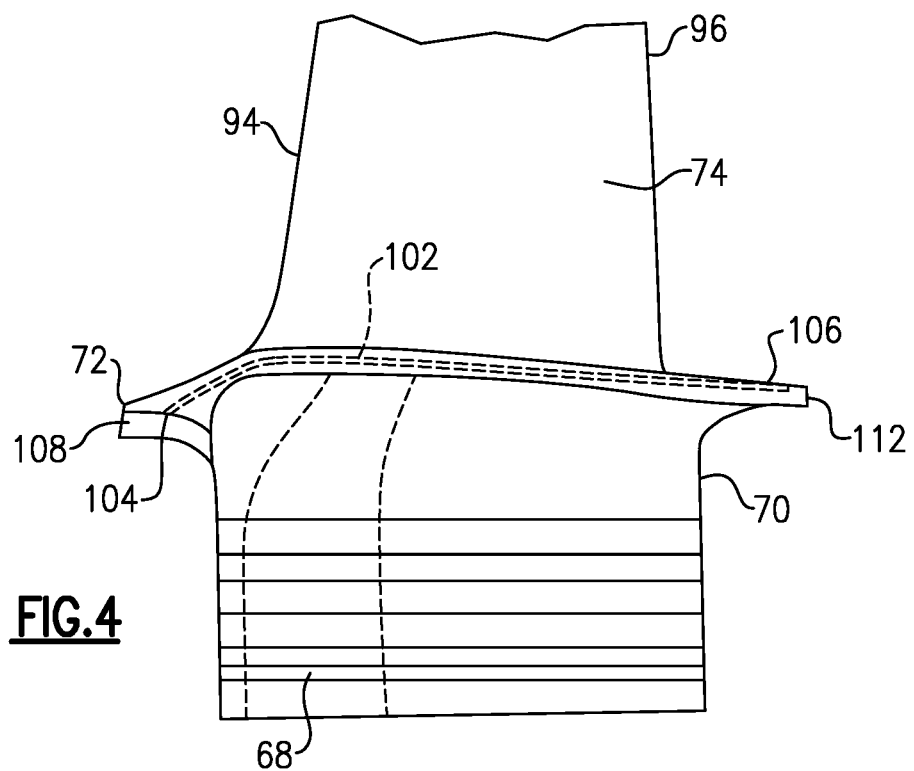
FIG. 4 illustrates a side view of the example rotor blade of FIG. 3.
Figure 5:
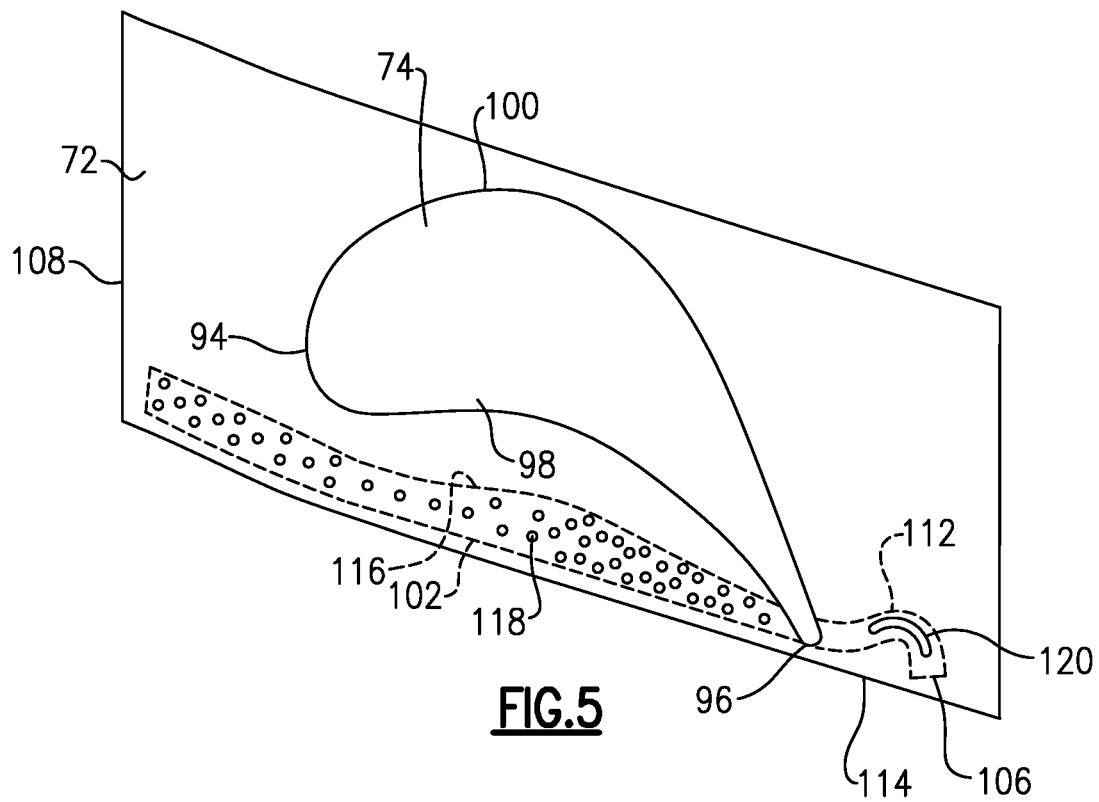
FIG. 5 illustrates a radially inward view of the example rotor blade of FIG. 3.

As shown in FIGS. 3-5, each of the array of rotor blades 64 includes a leading edge 94, a trailing edge 96, a pressure side 98, and a suction side 100. A cooling passage 102 extends through the platform 72 and is located on the pressure side 98 of the airfoil 74. The cooling passage 102 extends from an inlet 104 to an outlet 106 downstream. In the illustrated example, the inlet 104 is located on the radially innermost surface of the platform 72 at the respective axial location. At least one internal cooling passage 68 extends through the root portion 70 from a cooling air supply and extends radially outward into the airfoil 74 in a conventional manner.

The inlet 104 is located within a leading edge overhang 108 of the platform 72 upstream of the leading edge 94 of the airfoil 74. The inlet 104 is also located on a radially inner side, or second side, of the platform 72 upstream of the root portion 70 and the airfoil 74.

The outlet 106 is located adjacent a trailing edge 110 of the platform 72. The outlet 106 is located on a radially outer side, or first side, of the platform 72 such that the cooling air passing through the cooling passage 102 discharges into the hot gas path airflow passing over the airfoil 74. The outlet 106 is also located on the suction side 100 of the airfoil 74 in the platform 72 such that a portion of the cooling passage 102 travels through the platform 72 under the airfoil 74.

As shown in FIGS. 3 and 5, the cooling passage 102 passes through the platform 72, and beneath the trailing edge 96 of the airfoil 74 before being discharged through the outlet 106. In the illustrated example, a curved portion 112 in the cooling passage 102 curves away from a pressure side edge 114 upstream of the outlet 106 before curving back toward the pressure side edge 114 and being discharged through the outlet 106. The curved portion 112 in the cooling passage 102 directs the cooling air exiting the cooling passage 102 in a direction generally aligned with the main hot gas path airflow through the gas turbine engine 20. However, a generally straight cooling passage 102 between the inlet 104 and the outlet 106 may be utilized.

As shown in the illustrated example, the cooling passage 102 includes a bulged intermediate portion 116 with an increased width compared to portions of the cooling passage 102 axially upstream and downstream of the bulged intermediate portion 116. The bulged intermediate portion 116 increases the cooling surface area at a particular location in the cooling passage 102 and the heat transfer between the cooling passage 102 and the platform 72.

Various cooling structures 118 may be included in the cooling passage 102, such as pin fins, trip strips, guide vanes, pedestals, etc., that extend from a radially inner side of the cooling passage 102 to a radially outer side of the cooling passage 102. The cooling structures 118 may also be placed within the cooling passage 102 to manage stress, flow of the cooling air, and heat transfer. As shown in the illustrated example, the cooling structures 118 include pins formed within the cooling passage 102 and a rib 120 adjacent the outlet 106 to increase the heat transfer effect by the cooling passage 102.

During operation of the gas turbine engine 20, cooling air is directed toward the rotor assembly 60 with a first tangential onboard injector 122 (TOBI) and a second TOBI 124 as shown in FIG. 2. The first TOBI 122 includes an outlet 126 located radially inward from an outlet 128 of the second TOBI 124. The first TOBI 122 is located radially outward from the first abradable annular seal 86 and radially inward from the second abradable annular seal 88.

The first TOBI 122 directs cooling air generally tangential to the second disk plate 93 in the direction of rotation of the rotor assembly 60. By directing the cooling air in the direction of rotation of the rotor assembly 60, the first TOBI 122 creates a windage effect to reduce losses from the cooling air moving from a static structure, the first TOBI 122, to a rotating structure, the second disk plate 93.

The second TOBI 124 is located radially outward of the first abradable annular seal 86 and the second abradable annular seal 88. The second TOBI 124 directs cooling air generally tangential to the root portion 70 in the direction of rotation of the first rotor assembly 60 to reduce losses from the cooling air moving from a static structure, the second TOBI 124, to a rotating structure, the root portion 70.

A forward stage cavity 130 is defined at least by the rotor assembly 60 and the array of vanes 62. Cooling air from the forward stage cavity 130 is directed into the inlet 104 of the cooling passage 102. By locating the inlet 104 on the radially inner side of the leading edge overhand 108 of the platform 72, the hot gas path airflow is directed away from the inlet 104 to prevent ingestion of the hot gas path airflow in the cooling passage 102. The location of the inlet 104 is also less prone to being clogged by debris due to the high movement of cooling air passing though the forward stage cavity 130 compared to locations axially downstream of the forward stage cavity 130. Once the cooling air has entered the inlet 104, the cooling air travels through the cooling passage 102 to cool the platform 72 before exiting through the outlet 106 and mixing with the hot gas path airflow.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine component comprising:
   an airfoil having a leading edge and extending from a first side of a platform having a leading edge overhang;
   a root portion extending from a second side of the platform opposite the first side; and
   a cooling passage extending through the platform and beneath a trailing edge of the airfoil, the cooling passage including an inlet located on a second opposite side of the platform, wherein the inlet is located axially upstream of the leading edge of the airfoil and the inlet is located axially upstream of the root portion in the leading edge overhang.

2. The component of claim 1, wherein the cooling passage includes an outlet located on the first side of the platform.

3. The component of claim 1, wherein the cooling passage extends beneath a portion of the airfoil.

4. The component of claim 3, wherein a first portion of the cooling passage is located on a pressure side of the platform and a second portion of the cooling passage is located on a suction side of the platform.

5. The component of claim 1, wherein the cooling passage includes a plurality of cooling structures extending from a radially inner side of the cooling passage to a radially outer side of the cooling passage.

6. The component of claim 1, wherein the component is a turbine blade for a gas turbine engine.

7. The component of claim 1, wherein the cooling passage includes an outlet located on the first side of the platform and the cooling passage includes a plurality of cooling structures extending from a radially inner side of the cooling passage to a radially outer side of the cooling passage.

8. A gas turbine engine comprising:
   a first array of vanes; and
   a first rotor assembly including a first array of rotor blades located downstream of the first array of vanes, wherein at least one of the first array of rotor blades includes a cooling passage extending through a platform and beneath a trailing edge of an airfoil with an inlet to the cooling passage located axially upstream of a leading edge of the airfoil and in a radially inner side of a leading edge overhang of the platform.

9. The gas turbine engine of claim 8, wherein the leading edge overhang is located axially forward of a root portion of the at least one of the first array of rotor blades.

10. The gas turbine engine of claim 9, further comprising a first tangential onboard injector configured to direct cooling air at the first rotor assembly.

11. The gas turbine engine of claim 10, further comprising a second tangential onboard injector configured to direct cooling air at the first array of rotor blades.

12. The gas turbine engine of claim 11, wherein the second tangential onboard injector is configured to direct cooling air into a forward stage cavity.

13. The gas turbine engine of claim 11, wherein the second tangential onboard injector is located radially outward from the first tangential onboard injector.

14. The gas turbine engine of claim 8, wherein a portion of the cooling passage is located on a pressure side of the platform.

15. The gas turbine engine of claim 8, further comprising an outlet located on a radially outer side of the platform.

16. The gas turbine engine of claim 8, wherein the cooling passage includes an outlet located on the first side of the platform and the cooling passage includes a plurality of cooling structures extending from a radially inner side of the cooling passage to a radially outer side of the cooling passage.

17. The gas turbine engine of claim 16, further comprising a first tangential onboard injector configured to direct cooling air at the first rotor assembly and a second tangential onboard injector configured to direct cooling air at the first array of rotor blades, wherein the second tangential onboard injector is configured to direct cooling air into a forward stage cavity and the second tangential onboard injector is located radially outward from the first tangential onboard injector.

18. A method of cooling a gas turbine engine component comprising:
   directing cooling air into a forward stage cavity;
   directing the cooling air through an inlet in an overhang of a platform of at least one rotor blade having an airfoil with a leading edge and beneath a trailing edge of the airfoil, wherein the overhang is a leading edge overhang located axially forward of the leading edge of the airfoil; and
   directing the cooling air through a cooling passage extending through the platform of the at least one rotor blade.

19. The method of claim 18, further comprising directing the cooling air into the forward stage cavity with a tangential onboard injector.

20. The method of claim 18, wherein at least one rotor blade includes a root portion extending from a second side of the platform and the inlet is located axially upstream of the root portion.

* * * * *